US012725130B2

(12) United States Patent
Vah et al.

(10) Patent No.: US 12,725,130 B2
(45) Date of Patent: Sep. 1, 2026

(54) PREDICTING DEVICE COMPONENTS FOR REPAIR AND/OR REPLACEMENT USING ARTIFICIAL INTELLIGENCE TECHNIQUES

(71) Applicant: Dell Products L.P., Round Rock, TX (US)

(72) Inventors: Jeffrey S. Vah, Round Rock, TX (US); Ravi Shukla, Whitefield (IN); Romulo Teixeira De Abreu Pinho, Niteroi (BR); Adriana B. Prado, Niteroi (BR); Aaron Sanchez, Austin, TX (US); Bharathi Raja Kalyanasundaram, Dharmapuri (IN); Edward Fraser, Newport (IE)

(73) Assignee: Dell Products L.P., Round Rock, TX (US)

(*) Notice: Subject to any disclaimer, the term of this patent is extended or adjusted under 35 U.S.C. 154(b) by 97 days.

(21) Appl. No.: 18/647,487

(22) Filed: Apr. 26, 2024

(65) Prior Publication Data

US 2025/0335878 A1 Oct. 30, 2025

(51) Int. Cl.
*G06Q 10/20* (2023.01)

(52) U.S. Cl.
CPC .................................... *G06Q 10/20* (2013.01)

(58) Field of Classification Search
CPC ...................................................... G06Q 10/20
See application file for complete search history.

(56) References Cited

U.S. PATENT DOCUMENTS 10,452,062 B2 10/2019 Smit et al.
2015/0269153 A1* 9/2015 Fink .................. G06F 16/24578 707/750

(Continued)

FOREIGN PATENT DOCUMENTS

CN 110011881 B 7/2019
CN 116134394 A * 5/2023 ......... G06Q 30/0631
KR 102063171 B1 6/2019

OTHER PUBLICATIONS

"Text Classification with TF-IDF, LSTM, BERT: a comparison of performance" by Feldges, dated Apr. 2, 2022 https://web.archive.org/web/20220901162253/https://medium.com/@claude.feldges/text-classification-with-tf-idf-lstm-bert-a-quantitative-comparison-b8409b556cb3 (Year: 2022).*

(Continued)

*Primary Examiner* — Rupangini Singh
(74) *Attorney, Agent, or Firm* — Ryan, Mason & Lewis, LLP

(57) ABSTRACT

Methods, apparatus, and processor-readable storage media for predicting device components for repair and/or replacement using artificial intelligence techniques are provided herein. An example computer-implemented method includes obtaining information pertaining to at least one device defect; defining multiple device component categories related to the device defect(s); determining one or more of the device component categories as associated with the device defect(s) by processing at least a first portion of the information using one or more artificial intelligence techniques; identifying one or more device components associated with at least a second portion of the information; predicting at least one of the identified device component(s), based on comparing the identified device component(s) and the one or more determined device component categories, as needing to be repaired and/or replaced in connection with at least a portion of the device defect(s); and performing one or more automated actions based on the predicting.

20 Claims, 10 Drawing Sheets

(56) References Cited

U.S. PATENT DOCUMENTS

2016/0069778 A1* 3/2016 Sahu ...................... G06Q 10/20
702/183
2017/0132577 A1* 5/2017 Merg .................... G06F 16/285
2019/0156298 A1* 5/2019 Ethington ............ G06N 3/0499
2021/0406832 A1* 12/2021 Tennur Narayanan ......................
G06F 11/302
2022/0026895 A1* 1/2022 Leitch ....................... B64F 5/40

OTHER PUBLICATIONS

Susto et al., "Machine Learning for Predictive Maintenance: A Multiple Classifier Approach" dated Jun. 2015, IEEE Transactions on Industrial Informatics, vol. 11, No. 3, pp. 812-819 (Year: 2015).*
Ucar et al., "Artificial Intelligence for Predictive Maintenance Applications: Key Components, Trustworthiness, and Future Trends", Applied Sciences, Jan. 2024, 14(2):898. (Year: 2024).*
HuggingFace.Co, Sentence Transformers, https://huggingface.co/sentence-transformers, Apr. 17, 2024.

* cited by examiner

102-1 USER DEVICE 102-2 USER DEVICE

Figure 1:
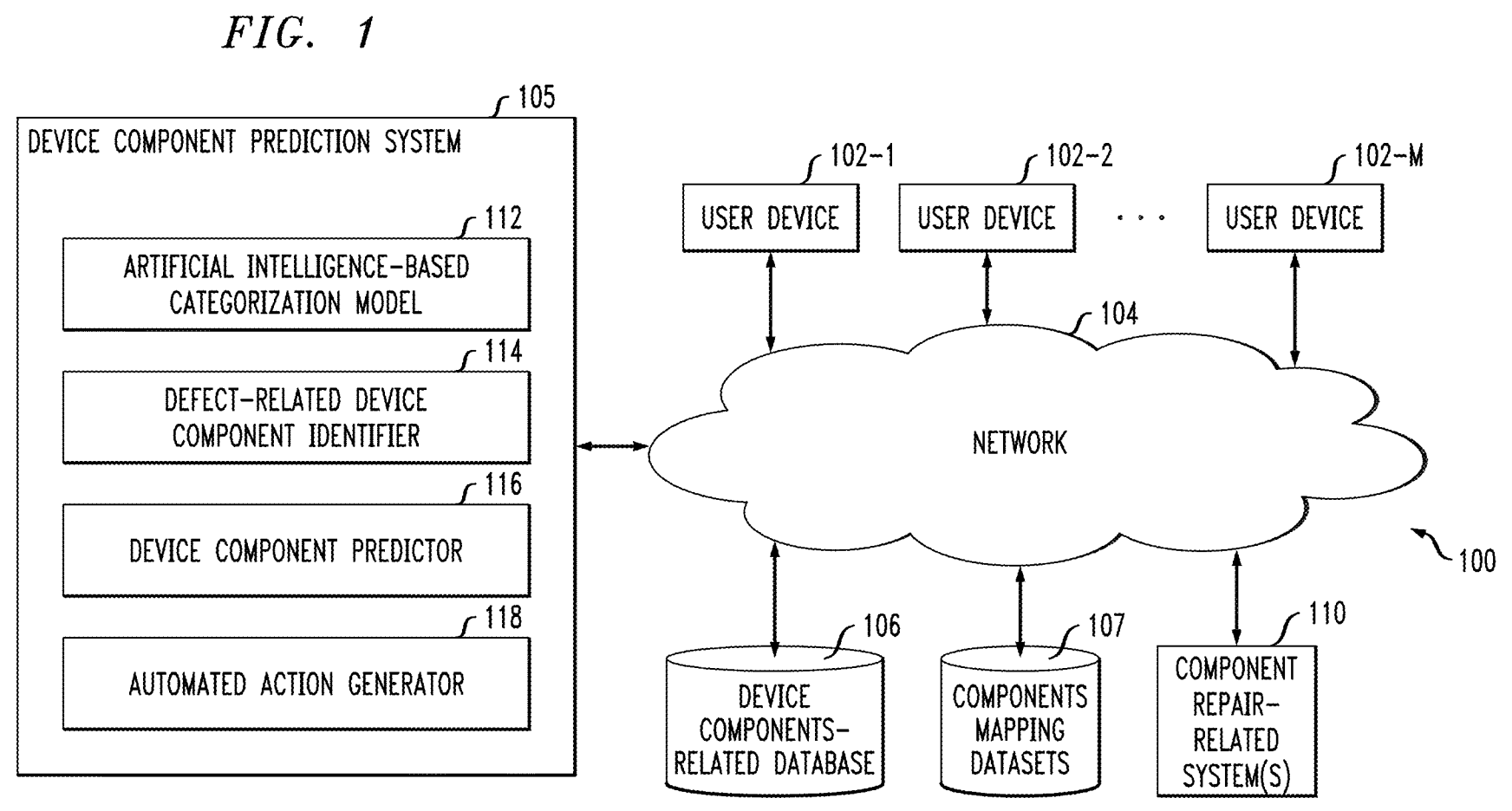

102-M USER DEVICE

104 NETWORK

106 DEVICE COMPONENTS-RELATED DATABASE

107 COMPONENTS MAPPING DATASETS

110 COMPONENT REPAIR-RELATED SYSTEM(S)

105 DEVICE COMPONENT PREDICTION SYSTEM

112 ARTIFICIAL INTELLIGENCE-BASED CATEGORIZATION MODEL

114 DEFECT-RELATED DEVICE COMPONENT IDENTIFIER

116 DEVICE COMPONENT PREDICTOR

118 AUTOMATED ACTION GENERATOR

| PROBLEM DESCRIPTION | | | | | | REPLACED COMPONENTS (GROUND-TRUTH) |
|---|---|---|---|---|---|---|
| ERROR_DESCRIPTION | REPAIR_SYMPTOM | REPAIR_REASON | REPAIR_ACTION | MODEL | PART_NUMBER | COMPONENT_REMOVED_DESCRIPTION |
| DEVICE REQUIRES REWORK, IS NOT DAMAGED, AND FAILS FUNCTIONAL TEST | NO POWER | DEFECTIVE COMPONENT | REPLACE | MODEL-1 | PART-1 | COMPONENT-1 |
| DEVICE REQUIRES REWORK, IS NOT DAMAGED, AND FAILS FUNCTIONAL TEST | NO POWER | DEFECTIVE COMPONENT | REPLACE | MODEL-2 | PART-2 | COMPONENT-2 |
| DEVICE REQUIRES REWORK, IS NOT DAMAGED, AND FAILS FUNCTIONAL TEST | NO AUDIO | DEFECTIVE COMPONENT | REPLACE | MODEL-3 | PART-3 | COMPONENT-3 |
| DEVICE REQUIRES REWORK, IS NOT DAMAGED, AND FAILS FUNCTIONAL TEST | NO VIDEO | DEFECTIVE COMPONENT | REPLACE | MODEL-1 | PART-1 | COMPONENT-4 |
| DEVICE REQUIRES REWORK, IS NOT DAMAGED, AND FAILS FUNCTIONAL TEST | NO POWER | DEFECTIVE COMPONENT | REPLACE | MODEL-4 | PART-4 | COMPONENT-5 |

| PART NUMBER | DESCRIPTION | COMMODITY_CODE | MANUFACTURER |
|---|---|---|---|
| ABC10 | DEVICE COMPONENT DESCRIPTION | CAPACITOR | MANUFACTURER-1 |
| ABC11 | DEVICE COMPONENT DESCRIPTION | CAPACITOR | MANUFACTURER-2 |
| ABC12 | DEVICE COMPONENT DESCRIPTION | RESISTOR | MANUFACTURER-3 |
| ABC13 | DEVICE COMPONENT DESCRIPTION | RESISTOR | MANUFACTURER-4 |
| ABC14 | DEVICE COMPONENT DESCRIPTION | RESISTOR | MANUFACTURER-5 |
| ABC15 | DEVICE COMPONENT DESCRIPTION | CAPACITOR | MANUFACTURER-2 |
| ABC16 | DEVICE COMPONENT DESCRIPTION | RESISTOR | MANUFACTURER-1 |
| ABC17 | DEVICE COMPONENT DESCRIPTION | CAPACITOR | MANUFACTURER-2 |
| ABC18 | DEVICE COMPONENT DESCRIPTION | RESISTOR | MANUFACTURER-4 |
| ABC19 | DEVICE COMPONENT DESCRIPTION | RESISTOR | MANUFACTURER-5 |
| ABC20 | DEVICE COMPONENT DESCRIPTION | RESISTOR | MANUFACTURER-4 |

| PRINTED CIRCUIT BOARD COMPONENT | SUB-CLUSTER |
|---|---|
| COMPONENT-1 | 1_A |
| COMPONENT-2 | 1_A |
| COMPONENT-3 | 1_A |
| COMPONENT-4 | 1_A |
| COMPONENT-5 | 1_A |
| COMPONENT-6 | 1_A |
| COMPONENT-7 | 1_A |
| COMPONENT-8 | 1_B |
| COMPONENT-9 | 1_B |
| COMPONENT-10 | 1_B |
| COMPONENT-11 | 1_B |
| COMPONENT-12 | 1_B |
| COMPONENT-13 | 1_B |
| COMPONENT-14 | 1_C |
| COMPONENT-15 | 1_C |
| COMPONENT-16 | 1_C |
| COMPONENT-17 | 1_C |
| COMPONENT-18 | 1_D |
| COMPONENT-19 | 1_D |
| COMPONENT-20 | 1_D |
| COMPONENT-21 | 1_D |
| COMPONENT-22 | 1_A |

| COMPONENT DESCRIPTION | SUB_CLUSTERS_REVISED |
|---|---|
| COMPONENT-1 | 0_C |
| COMPONENT-2 | 0_C |
| COMPONENT-3 | 0_C |
| COMPONENT-4 | 0_C |
| COMPONENT-5 | 0_C |
| COMPONENT-6 | 0_C |
| COMPONENT-7 | 0_C |
| COMPONENT-8 | 0_C |
| COMPONENT-9 | 0_C |
| COMPONENT-10 | 0_C |
| COMPONENT-11 | 0_C |
| COMPONENT-12 | 0_C |
| COMPONENT-13 | 0_C |
| COMPONENT-14 | 0_C |

700

| COMPONENT DESCRIPTION FROM BILL OF MATERIALS (BOM) DATASET | PART_DESCRIPTION (F VALUE) |
|---|---|
| COMPONENT-1 DESCRIPTION | KEYWORD MATCH-1 |
| COMPONENT-2 DESCRIPTION | KEYWORD MATCH-2 |
| COMPONENT-3 DESCRIPTION | KEYWORD MATCH-3 |
| COMPONENT-4 DESCRIPTION | KEYWORD MATCH-4 |
| COMPONENT-5 DESCRIPTION | KEYWORD MATCH-5 |
| COMPONENT-6 DESCRIPTION | KEYWORD MATCH-6 |
| COMPONENT-7 DESCRIPTION | KEYWORD MATCH-7 |
| COMPONENT-8 DESCRIPTION | KEYWORD MATCH-8 |

*FIG. 7*

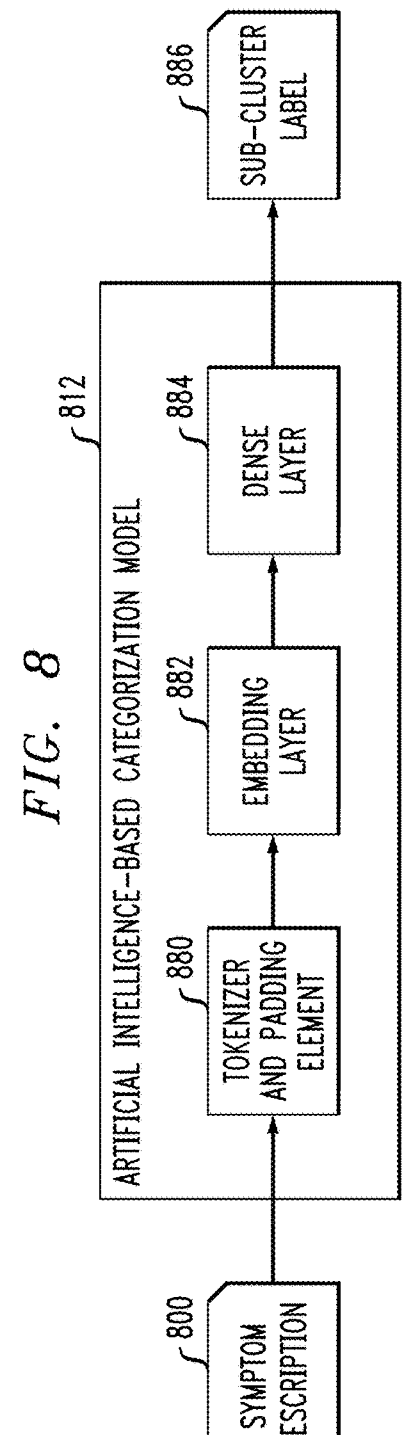

*FIG. 8*

907
COMPONENT MAPPING DATASETS
906-1
HISTORICAL REPAIRS
905
DEVICE COMPONENT PREDICTION SYSTEM
900
SYMPTOM DESCRIPTION
912
ARTIFICIAL INTELLIGENCE-BASED CATEGORIZATION MODEL
987
SUB-CLUSTER LABEL COMPONENTS
994
MATCH AND RANK
996
LIST OF COMPONENTS
901
PART NUMBER (PN)
990
FILTER
992
PN SUPPORTED COMPONENTS
906-2
BOM DATASET
907
COMPONENT MAPPING DATASETS

1000

| PN | COMPONENT_ DESCRIPTION | SUB-CLUSTER | SUB-CLUSTER DESCRIPTION | REFERENCE DESIGNATOR |
|---|---|---|---|---|
| 123AB | COMPONENT DESCRIPTION-1 | 9_B | POWER, INTEGRATED CIRCUIT, SWITCH | REFERENCE DESIGNATOR-1 |
| 124AB | COMPONENT DESCRIPTION-2 | 4_B | DIODE, ZENER DIODE, ELECTROSTATIC DISCHARGE COMPONENT | REFERENCE DESIGNATOR-2 |

1200

1210-1
APPS
1210-2
APPS
1210-L
APPS 1202-1
VM AND/OR CONTAINER SET 1
1202-2
VM AND/OR CONTAINER SET 2
. . .
VM AND/OR CONTAINER SET L
1202-L

VIRTUALIZATION INFRASTRUCTURE
1204

PHYSICAL INFRASTRUCTURE
1205

PREDICTING DEVICE COMPONENTS FOR REPAIR AND/OR REPLACEMENT USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Attempts at repairing certain device components (e.g., components from sophisticated devices such as printed circuit boards (PCBs)) commonly face numerous challenges. For example, conventional device management approaches often include significant variation across repair sites and across device components, which can result in lower repair yields, resource-related inefficiencies, and increased repeat return rates, which decreases available inventory and increases scrap rates (due, e.g., to multiple return cycles).

SUMMARY

Illustrative embodiments of the disclosure provide techniques for predicting device components for repair and/or replacement using artificial intelligence techniques.

An exemplary computer-implemented method includes obtaining information pertaining to at least one device defect, defining multiple device component categories related to the at least one device defect, and determining one or more of the multiple device component categories as associated with the at least one device defect by processing at least a first portion of the obtained information using one or more artificial intelligence techniques. The method also includes identifying one or more device components associated with at least a second portion of the obtained information, and predicting at least one of the one or more device components associated with the at least a second portion of the obtained information, based at least in part on comparing (i) the one or more device components associated with the at least a second portion of the obtained information and (ii) the one or more device component categories associated with the at least one device defect, as needing to be at least one of repaired and replaced in connection with at least a portion of the at least one device defect. Further, the method also includes performing one or more automated actions based at least in part on the predicting of the at least one of the one or more device components as needing to be at least one of repaired and replaced.

Illustrative embodiments can provide significant advantages relative to conventional device management approaches. For example, problems associated with lower repair yields, resource-related inefficiencies, and increased repeat return rates are overcome in one or more embodiments through automatically predicting one or more device components to be repaired and/or replaced in connection with a given device defect by processing a variety of data pertaining to the given device defect using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 1 shows an information processing system configured for predicting device components for repair and/or replacement using artificial intelligence techniques in an illustrative embodiment.

FIG. 2 shows example portions of a symptoms dataset in an illustrative embodiment.

FIG. 3 shows an example portion of a bill of materials dataset in an illustrative embodiment.

FIG. 4 shows an example table of sub-clustering of different types of PCB components in an illustrative embodiment.

FIG. 6 shows an example table relating to a string-matching mechanism in an illustrative embodiment.

FIG. 7 shows an example mapped dataset in an illustrative embodiment.

FIG. 8 shows model architecture for predicting sub-cluster labels from symptom descriptions in an illustrative embodiment.

DETAILED DESCRIPTION

Figure 5:
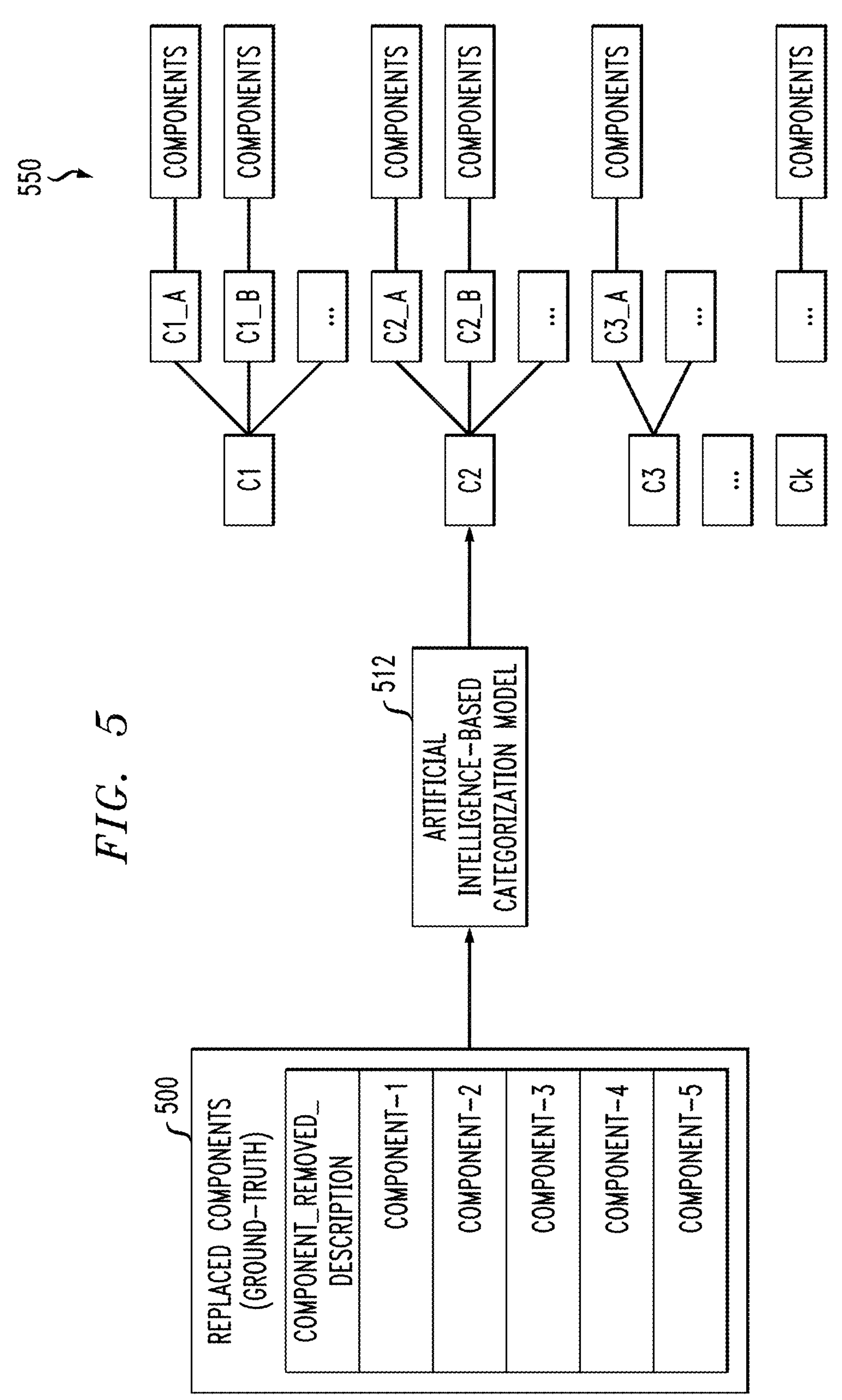
FIG. 5 shows an example clustering and sub-clustering workflow in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device component prediction system 105 and one or more component repair-related systems 110.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device component prediction system 105 can have an associated device components-related database 106 configured to store data pertaining to historical device component repairs, device component identifier information, etc. Further, the device component prediction system 105 can also have associated component mapping datasets 107 as further detailed herein.

The device components-related database 106 and/or component mapping datasets 107 in the present embodiment are implemented using one or more storage systems associated with the device component prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the device component prediction system 105 are one or more input-output devices, which illustratively comprise keyboards, displays or other types of input-output devices in any combination. Such input-output devices can be used, for example, to support one or more user interfaces to the device component prediction system 105, as well as to support communication between the device component prediction system 105 and other related systems and devices not explicitly shown.

Additionally, the device component prediction system 105 in the FIG. 1 embodiment is assumed to be implemented using at least one processing device. Each such processing device generally comprises at least one processor and an associated memory, and implements one or more functional modules for controlling certain features of the device component prediction system 105.

More particularly, the device component prediction system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the device component prediction system 105 to communicate over the network 104 with the user devices 102, and illustratively comprises one or more conventional transceivers.

The device component prediction system 105 further comprises artificial intelligence-based categorization model 112, defect-related device component identifier 114, device component predictor 116 and automated action generator 118.

It is to be appreciated that this particular arrangement of elements 112, 114, 116 and 118 illustrated in the device component prediction system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for predicting device components for repair using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of device component prediction system 105, device components-related database 106, component mapping datasets 107, and component repair-related system(s) 110 can be on and/or part of the same processing platform.

An exemplary process utilizing elements 112, 114, 116 and 118 of an example device component prediction system 105 in computer network 100 will be described in more detail with reference to the flow diagram of FIG. 11.

Accordingly, at least one embodiment includes predicting device components for repair and/or replacement using artificial intelligence techniques. For example, one or more example embodiments include implementing machine learning-based techniques for repairing one or more PCB component failures and/or defects. Such an embodiment includes combining domain knowledge, unsupervised and supervised learning, and one or more statistical approaches to overcome various issues associated with conventional approaches as well as issues related to training data scarcity. More particularly, such an embodiment includes predicting PCB repair components by determining and/or generating a list of components that are highly probable to contain the desired components to be replaced in a first repair visit, which facilitates component selection with targeted suggestions.

One or more embodiments, as detailed herein, include data preparation and/or data preprocessing steps. For example, such steps include obtaining at least one training dataset that contains device component symptom descriptions (e.g., descriptions transcribed from user issue reports) and corresponding ground truth information pertaining to the device components (e.g., PCB components) replaced on users' systems. Such a dataset is also referred to herein as a symptoms dataset (SD), and an example of which is further detailed in connection with FIG. 2.

The data preparation and/or data preprocessing steps can also include obtaining at least a second dataset that contains descriptions of supported device components (e.g., PCB components) of multiple items associated with a given enterprise (e.g., in an enterprise's client product portfolio), identified by an identifier such as, e.g., a part number (PN). Such a dataset is also referred to herein as a bill of materials (BOM), and such a dataset can also serve as a source of truth for ordering components from the respective manufacturers and/or component suppliers.

As part of data preparation and/or data preprocessing, at least one embodiment also includes employing at least one text embedding mechanism that transforms the textual representations obtained in connection with SD and BOM into one or more d-dimensional real-valued vectors. Such an embodiment can additionally include implementing at least one clustering algorithm on at least a portion of the embedded vectors to obtain k centroids, $\{C_1, \ldots, C_k\}$, each corresponding to a high-level component class (e.g., connector). Using the at least one clustering algorithm in conjunction with domain knowledge, such an embodiment can include defining one or more subclusters within the initial clusters to represent one or more lower-level component classes (e.g., registered jack 45 (RJ45) connector, universal serial bus (USB) connector, etc.). Further, one or more hierarchical labels (e.g., arbitrary hierarchical labels) can be assigned to each subcluster (e.g., $C_1$_A, $C_1$_B, . . . , $C_2$_A, $C_2$_B, . . . , $C_k$_A, $C_k$_B, . . . ). Additionally, in at least one embodiment, ground truth information pertaining to repaired components can be replaced in the at least one training dataset with the corresponding subcluster labels. For example, this step can replace N target components with K target cluster labels, wherein K<<N.

In addition to the data preparation and/or data preprocessing steps, one or more embodiments include model training steps and inference steps. For example, such an embodiment can include training one or more artificial intelligence techniques (e.g., at least one machine learning model) to predict one or more subcluster labels from one or more device component symptom descriptions. In at least one embodiment, training such artificial intelligence techniques can include training at least one deep learning-based natural language processing (NLP) model (e.g., a long short-term memory (LSTM) model and/or a transformers-based model) to predict subcluster labels.

Also, in one or more embodiments, inference steps can include obtaining at least one symptom description and at least one PN (e.g., from a new user issue report) associated with at least one device component, and providing the at least one symptom description as input to the trained artificial intelligence techniques, which processes at least a portion of such input to determine the top M predicted subcluster labels. As noted above, in such an embodiment, each subcluster comprises a set of device components of the same type and/or category. Additionally, at least one embodiment includes filtering the BOM dataset by the at least one PN associated with the at least one device component noted above. The result of such filtering can include a set of all supported device components (e.g., PCB components) associated with the at least one PN.

In one or more embodiments, inference steps can also include determining and/or identifying text-based intersections between the description(s) of the device component(s) of the predicted top M subclusters and the description(s) of the device component(s) obtained from the BOM dataset. Such a step can be carried out, for example, because device component descriptions across the symptom dataset and the BOM dataset may not be uniform and/or consistent, and such a step ameliorates any discrepancies. The intersections can be ranked based at least in part on their level of intersection (e.g., the number of text terms), and at least one embodiment can include keeping only the top n device components of the ranking. Further, in one or more embodiments, an automated process can rank the top n device components based at least in part on statistical information that informs the most frequently replaced components on the corresponding PN.

For example, by running a query on a historical database containing data pertaining to replaced parts, such an embodiment can include retrieving data pertaining, e.g., to parts sorted from the most frequently replaced to the least frequently replaced. By crossing this sorted list with one or more suggestions generated using at least a portion of the techniques detailed herein, the one or more suggestions can also be sorted using the same criteria. For instance, if the query returns parts A, B, C, D, and E in the order of most frequently replaced to least frequently replaced, and a generated suggestion suggests parts D, E, and B, at least one embodiment can include further reordering the suggestion as B, D, E to match the ordering obtained from the query.

Also, in at least one example embodiment, this ranked output can be leveraged by one or more technicians and/or automated systems as a guide towards selecting the correct and/or appropriate device component(s) to be repaired and/or replaced according to the issue description(s).

Accordingly, as detailed herein, one or more embodiments include using clustering and deep learning-based classification techniques to predict device component (e.g., PCB component) failures and/or defects from at least one imbalanced label set using historical device component repair data. Also, such an embodiment includes substituting, in at least one training dataset, data pertaining to ground truth replaced device components with subcluster labels obtained from a combination of domain expertise and unsupervised clustering in an embedded vector space of device component descriptions. Further, as also detailed herein, such an embodiment includes implementing an automated process that ranks a list of predicted device components generated using the above-noted artificial intelligence techniques, based at least in part on frequency of repair and/or replacement on a per symptom basis.

FIG. 2 shows example portions of a SD in an illustrative embodiment. As part of data preparation and/or data preprocessing steps, one or more example embodiments include obtaining at least one training dataset that contains symptom descriptions and ground truth device components (e.g., PCB components) replaced on user systems. For example, the symptom descriptions can be derived from transcriptions of user issue reports collected by support agents as free text. Such a dataset, as noted herein, is referred to as a symptoms dataset (SD), and portions of an example SD 200 are depicted in FIG. 2. Note that the ground truth replaced components illustrated in example SD 200 contain detailed descriptions and specifications of the device components that were replaced. Additionally, as illustrated in example SD 200, such SDs can include a combination of various text columns (e.g., error description, repair symptom, repair reason, repair action, device component model, part number, etc.), which can be generally referred to as problem description.

FIG. 3 shows an example portion of a BOM dataset in an illustrative embodiment. In addition to the techniques detailed in connection with FIG. 2, one or more embodiments include obtaining at least a second dataset that contains descriptions of supported device components (e.g., PCB components) of items in a given collection and/or set (e.g., an enterprise client product portfolio), identified by PN. By way of illustration, FIG. 3 depicts an example of such a dataset 300, which can be maintained by one or more support teams and is referred to as a BOM dataset. A BOM dataset, such as dataset 300 which includes information pertaining to device component PN, device component description, commodity code(s), and manufacturer information, is a source of truth for ordering components from respective manufacturers and/or component suppliers, and if a component is to be replaced on a user system, a repair technician can refer to the BOM dataset, e.g., in case one or more new components need to be ordered.

As detailed herein, at least one embodiment also includes projecting the descriptions of the ground truth device components in an SD onto a vectorial space via a text embedding mechanism. Such an embodiment can include, e.g., projecting similar descriptions onto neighboring regions of the vectorial space by employing a pre-trained sentence embedding transformer to obtain a 384-dimensional, real-valued vector for each component description.

Accordingly, in such an embodiment, similar components will appear in neighboring regions of the embedded space. At least one clustering algorithm can then be implemented to find sets of components that can be grouped together. One typical input parameter for clustering algorithms includes the number of clusters, k, that the algorithm is expected to find. One or more embodiments can include using prior domain knowledge about how components are categorized, and a value can be selected based thereon such as, e.g., k=14. As such, each cluster, $C_i$, $i \in [0, \ldots, k-1]$, corresponds to a high-level representation comprising multiple device components.

FIG. 4 shows an example table of sub-clustering of different types of PCB components (e.g., sockets) in an illustrative embodiment. In addition to the clustering detailed above, one or more embodiments include employing another clustering step to obtain at least one set of sub-clusters associated with each high-level cluster. This step can yield a more fine-tuned aggregation of the elements in each high-level cluster and facilitates finding and/or identifying one or more semantical relationships between device components. An example output of such sub-clustering is depicted in example table 400 in FIG. 4. More particularly, in example table 400, cluster "1" contains multiple types of PCB sockets (SKT), which directly resulted from unsupervised, high-level clustering such as detailed above. Each sub-cluster {1_A, . . . , 1_D} further aggregates the components into specific socket types. For example, sub-cluster 1_A refers to RJ45 connectors, sub-cluster 1_B refers to high-definition multimedia interface (HDMI) connectors, sub-cluster 1_C refers to double data rate (DDR) connectors, and sub-cluster 1_D refers to audio jack connectors.

FIG. 5 shows an example clustering and sub-clustering workflow in an illustrative embodiment. More particularly, FIG. 5 depicts a workflow including a clustering and sub-clustering process carried out by artificial intelligence-based categorization model 512, which results in a hierarchy of clusters 550 grouping ground truth components of a given SD 500. As depicted in FIG. 5, after the clustering and sub-clustering process, each ground truth component in SD 500 will be associated with one sub-cluster label, thereby generating hierarchy of clusters 550. Also, one or more embodiments include discarding the high-level cluster labels in connection with replacing the ground truth components in SD 500 with the associated sub-cluster labels.

As also detailed herein, at least one embodiment includes, as part of a data preparation and/or data preprocessing phase, creating at least one map between device component descriptions found in a given SD and device component descriptions found in a given BOM dataset. Such a map can be created, for example, because the BOM dataset can include a source of truth for ordering components from manufactures and/or device component suppliers, and as such, model predictions will need to be matched against what is available in the BOM dataset. However, in conventional approaches, component descriptions in a SD often do not match component descriptions in a BOM dataset. Accordingly, as further described herein, one or more embodiments include implementing at least one string-matching mechanism.

FIG. 6 shows an example table relating to a string-matching mechanism in an illustrative embodiment. For each sub-cluster, one or more embodiments can include taking the device component descriptions and determining the top w most frequently used words, referred to herein as the F value. For instance, for the subcluster 0_C shown in example table 600 in FIG. 6, the top four most frequently used keywords within the "part description" column, denoted by the F(0_C) value, can include, for example, F(0_C)=['IC', 'CODEC', 'AUDIO', 'S'].

FIG. 7 shows an example mapped dataset in an illustrative embodiment. One or more embodiments include comparing each device component description entry of a given BOM file with the F value of each sub-cluster (such as determined via the techniques detailed in connection with FIG. 6). In such an embodiment, the F value which has the highest number of matching keywords with a given entry is assigned as part_description for that entry, as depicted in example mapped dataset 700 in FIG. 7. Such steps generate a new dataset (e.g., example mapped dataset 700) with a mapping between sub-cluster labels (identified by their F value) and device component descriptions in the given BOM dataset. Note, for example, that the same F value can be assigned to multiple device components, but a component from the BOM dataset can only be mapped to a single F value. Such a dataset (e.g., example mapped dataset 700) is also referred to herein a component mapping, and such a dataset is used at inference time.

As also described herein, one or more embodiments include training at least one machine learning model to predict sub-cluster labels from symptom descriptions. Such an embodiment includes using a value, $y_2$, corresponding to the sub-cluster label {C1_A, C1_B, . . . } (see, e.g., FIG. 5) associated with the given ground truth component, and learning a mapping $y_2=f_2(X)$, wherein x represents the symptom(s) description(s).

FIG. 8 shows model architecture for predicting sub-cluster labels from symptom descriptions in an illustrative embodiment. By way of illustration, FIG. 8 depicts a symptom description 800 being processed by artificial intelligence-based categorization model 812 (which can include, e.g., a natural language processing model), which includes a text embedding mechanism, to generate at least one sub-cluster label 886 to be associated with at least a portion of the symptom description 800. More specifically, artificial intelligence-based categorization model 812 includes a tokenizer and padding element 880, an embedding layer 882 (wherein, e.g., d=128), and a dense layer 884 (wherein e.g., d=# of labels).

In one or more embodiments, a tokenizer of the tokenizer and padding element 880 breaks sentences and words of an input into elementary units (e.g., syllables, radicals, etc.) that are more amenable to one or more NLP tasks. A tokenizer of the tokenizer and padding element 880 also assigns a unique numerical code to each word and/or token found in the entire vocabulary of sentences used to train the model. A padding element of the tokenizer and padding element 880 makes the input sentence match the input size of the model (e.g., in number of words and/or tokens) by completing the input with one or more zeros. For instance, if the description has 100 words and/or tokens and the model expects an input of 200 words and/or tokens, the padding step adds 100 zeros to complete the input set. The embedding layer 882 transforms the unique token codes to another numerical representation that can be rendered, for example, in smaller dimensions. An advantage of the process detailed in connection with FIG. 8 is that the artificial intelligence-based categorization model 812, in one or more embodiments, only needs to learn to predict a limited number of sub-cluster labels instead of hundreds individual components.

Figure 9:
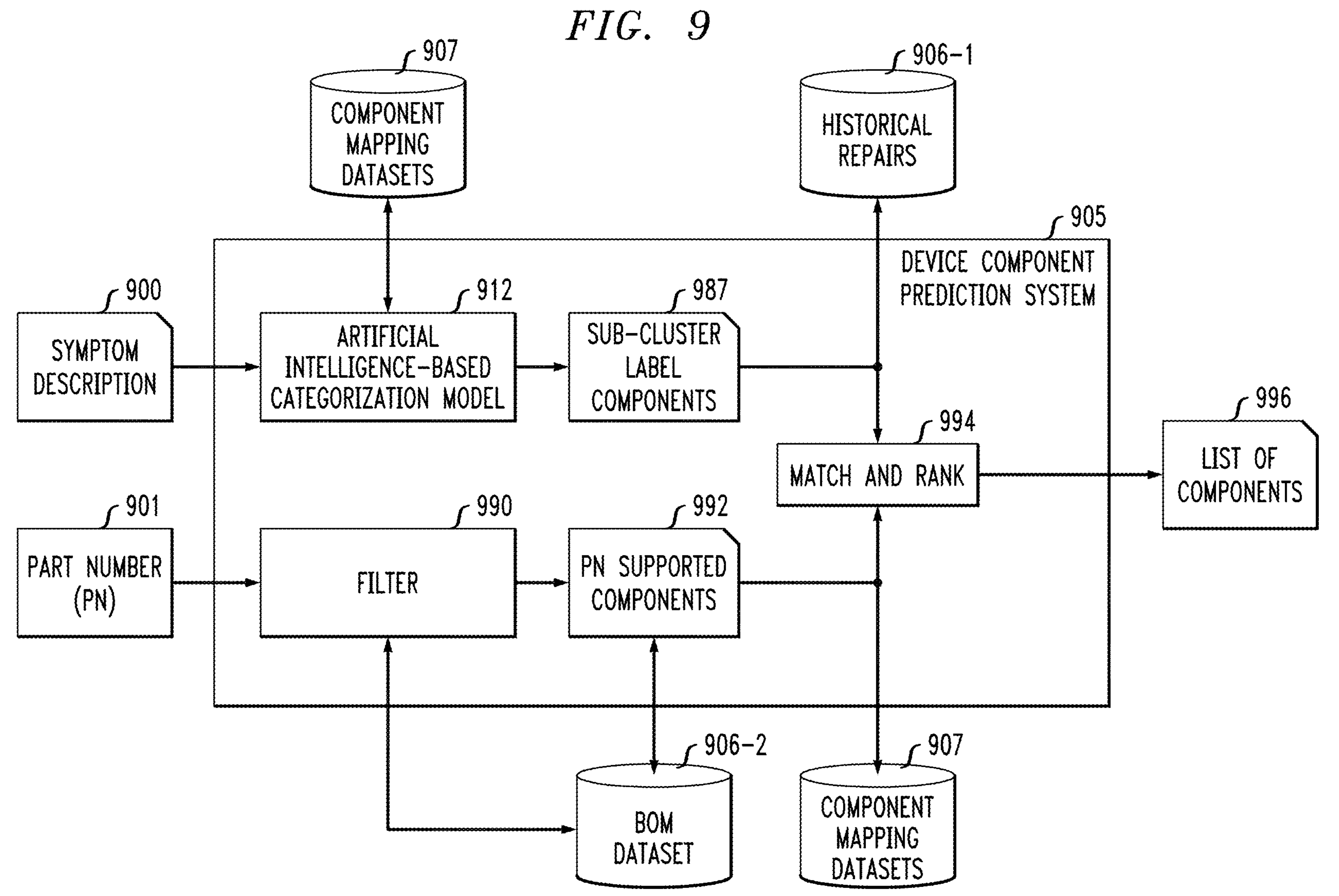
FIG. 9 shows system architecture for determining suggested set of device components to be repaired in an illustrative embodiment.

FIG. 9 shows system architecture for determining suggested set of device components to be repaired in an illustrative embodiment. In accordance with one or more example embodiments, at inference time, a user (e.g., a device-related technician) wishes to obtain a prediction of which PCB component(s) should be repaired and/or replaced in a given device. Such a prediction can include, for example, a list of device component suggestions provided based at least in part on corresponding predicted sub-cluster label(s) yielded by an NLP model. The user, in such an example embodiment, will provide at least the following information as input to the inferencing process detailed in connection with FIG. 9: a symptom description 900, and the PN 901 of the device to be repaired.

The top track of the FIG. 9 workflow within device component prediction system 905 illustrates the prediction of the sub-cluster label(s) as discussed above (e.g., in connection with FIG. 8) using artificial intelligence-based categorization model 912. Note that the workflow within device component prediction system 905 ultimately determines one or more sub-cluster label components 987 (e.g., the one or more PCB components associated with the predicted sub-cluster label(s)). Therefore, this sub-cluster label prediction step needs access to component mapping dataset(s) 907, generated during the data preparation and/or data preprocessing steps, to identify the device components associated with the predicted sub-cluster label(s).

On the bottom track of the FIG. 9 workflow within device component prediction system 905, the PN 901 of the malfunctioning device and is used to filter, via step 990, at least a portion of the data within BOM dataset 906-2 to obtain and/or identify one or more PN supported components 992 (e.g., the PCB components supported on that PN). In one or more embodiments, the one or more sub-cluster label components 987 identified via the artificial intelligence-based categorization model 912 is used to further filter the one or more PN supported components 992 obtained from the BOM dataset 906-2.

As also illustrated in FIG. 9, one or more embodiments include predicting the top M most probable sub-clusters according to the NLP model's output classification probabilities (e.g., the top M after applying soft max). The one or more sub-cluster label components 987 corresponding to the predicted sub-clusters and the one or more PN supported components 992 are processed during a match and rank step 994, which includes obtaining the F value associated with the sub-clusters and searching the component mapping dataset 907 for at least a portion of the one or more PN supported components 992 that are associated with that F value. Based at least in part thereon, device component prediction system 905 generates and/or outputs a list of components 996 (e.g., including component descriptions) related to the predicted sub-cluster. In addition to the matching techniques, step 994 also includes ranking at least a portion of the final list of components 996 based at least in part on how frequently the components are used in PCB repairs. To perform this ranking involves accessing data from historical repairs database 906-1, which contains information pertaining to component usage frequencies. Accordingly, in such an embodiment, a ranked list of device components is generated and output (e.g., to at least one repair technician) as a suggestion of which of the components are the best candidates to be used for the repair in question.

Figures 10, 11:
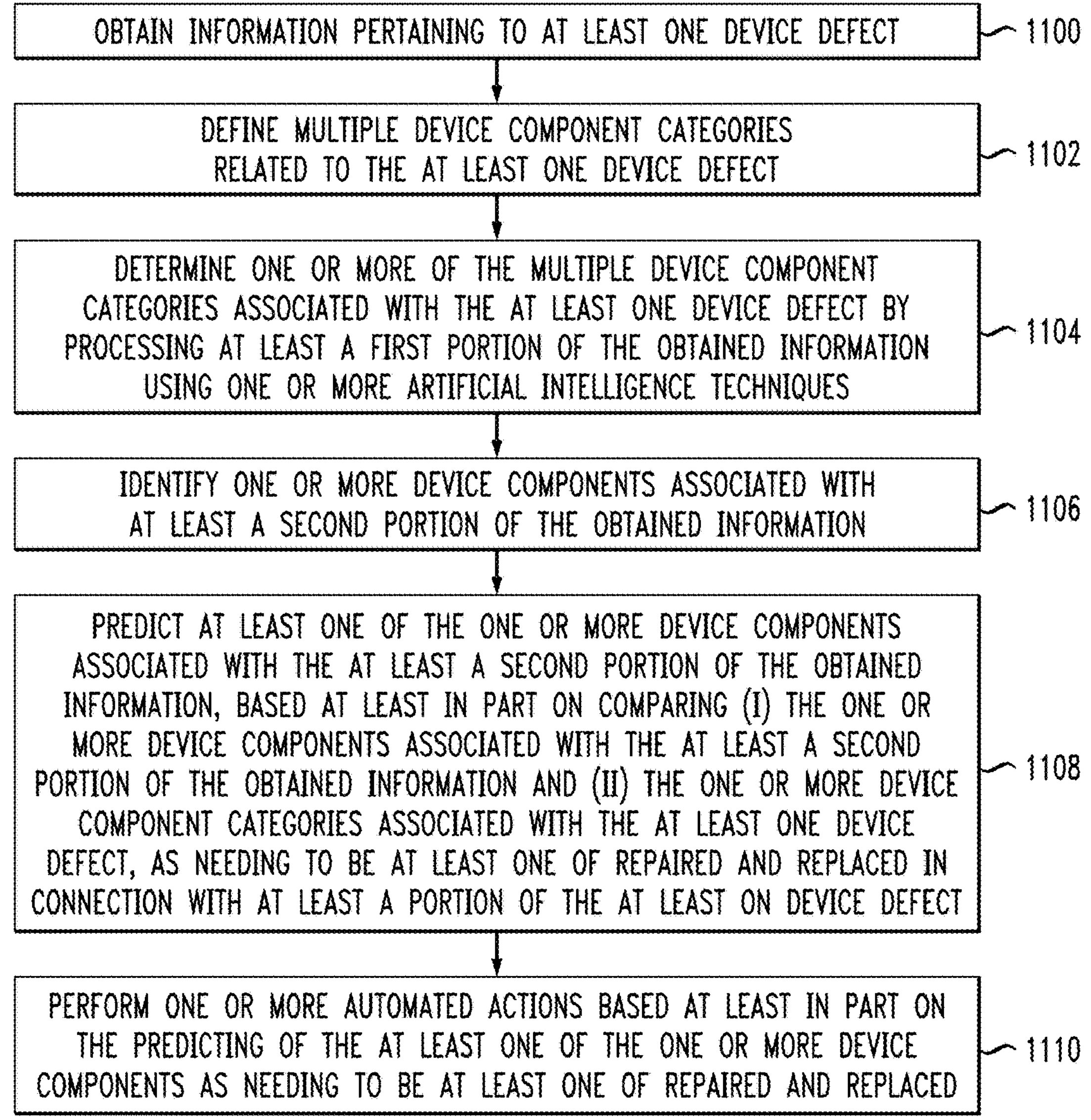
FIG. 10 shows an example table containing a list of predicted device components in an illustrative embodiment.
FIG. 11 is a flow diagram of a process for predicting device components for repair and/or replacement using artificial intelligence techniques in an illustrative embodiment.

FIG. 10 shows an example table containing a list of predicted device components in an illustrative embodiment. By way of illustration, FIG. 10 depicts example table 1000, which includes a list of predicted device components to be suggested for repair and/or replacement. Per example table 1000, the predicted top two sub-clusters include 9_B and 4_B, and the components identified within sub-cluster 9_B (F(9_B)) include [power, integrated circuit, switch], while the components identified within sub-cluster 4_B (F(4_B)) include [diode, Zener diode, electrostatic discharge component]. As also depicted in example table 1000, the PNs associated with these predicted sub-clusters and components are 123AB and 124AB, respectively.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on historical repair data, BOM data, component mapping data, etc., and such recommendations and/or predictions can be used to initiate one or more automated actions (e.g., automatically initiating one or more device component repair operations, automatically initiating one or more device component replacement operations, automatically retraining the model used to generate the recommendations and/or predictions, etc.).

FIG. 11 is a flow diagram of a process for predicting device components for repair and/or replacement using artificial intelligence techniques in an illustrative embodiment. It is to be understood that this particular process is only an example, and additional or alternative processes can be carried out in other embodiments.

In this embodiment, the process includes steps 1100 through 1110. These steps are assumed to be performed by the device component prediction system 105 utilizing elements 112, 114, 116 and 118.

Step 1100 includes obtaining information pertaining to at least one device defect. In at least one embodiment, obtaining information pertaining to at least one device defect includes obtaining at least one symptom description associated with the at least one device defect and at least one device identifier associated with at least a portion of the at least one device defect. Step 1102 includes defining multiple device component categories related to the at least one device defect.

Step 1104 includes determining one or more of the multiple device component categories as associated with the at least one device defect by processing at least a first portion of the obtained information using one or more artificial intelligence techniques. In one or more embodiments, determining one or more of the multiple device component categories as associated with the at least one device defect includes processing at least a portion of the at least one symptom description associated with the at least one device defect using the one or more artificial intelligence techniques. Additionally or alternatively, determining one or more of the multiple device component categories as associated with the at least one device defect can include processing the at least a first portion of the obtained information using one or more of at least one LSTM model and at least one transformers-based model. Further, in one or more embodiments, determining one or more of the multiple device component categories as associated with the at least one device defect includes processing the at least a first portion of the obtained information using at least one clustering algorithm in conjunction with one or more deep learning techniques. By way of example, such an embodiment can include using at least one deep learning-based model (e.g., a LSTM-based and/or a transformers-based NLP model) to predict one or more subcluster labels, which can then be used, as further detailed below and herein, to determine particular components using mapping techniques.

Step 1106 includes identifying one or more device components associated with at least a second portion of the obtained information. In at least one embodiment, identifying one or more device components associated with at least a second portion of the obtained information includes filtering at least one dataset pertaining to multiple device components related to the at least one device defect using the at least one device identifier associated with the at least a portion of the at least one device defect.

Step 1108 includes predicting at least one of the one or more device components associated with the at least a second portion of the obtained information, based at least in part on comparing (i) the one or more device components associated with the at least a second portion of the obtained information and (ii) the one or more device component categories associated with the at least one device defect, as needing to be at least one of repaired and replaced in connection with at least a portion of the at least one device defect. In one or more embodiments, predicting at least one of the one or more device components as needing to be at least one of repaired and replaced includes determining one or more text-based intersections between descriptions of device components associated with the one or more determined device component categories and descriptions of the one or more device components identified as associated with the at least a second portion of the obtained information. In such an embodiment, predicting at least one of the one or more device components as needing to be at least one of repaired and replaced can include ranking at least a portion of the one or more text-based intersections based at least in part on a number of terms shared in each of the one or more text-based intersections. Additionally or alternatively, predicting at least one of the one or more device components as needing to be at least one of repaired and replaced can include ranking at least a portion of the one or more text-based intersections based at least in part on information pertaining to historical frequency of at least one of device component repairs and device component replacements components across the one or more device components identified as associated with the at least a second portion of the obtained information.

Step 1110 includes performing one or more automated actions based at least in part on the predicting of the at least one of the one or more device components as needing to be at least one of repaired and replaced. In at least one embodiment, performing one or more automated actions includes automatically generating and outputting at least one recommendation, to one or more component repair technicians and/or systems, in connection with the at least one of the one or more device components predicted as needing to be at least one of repaired and replaced. Additionally or alternatively, performing one or more automated actions can include automatically training at least a portion of the one or more artificial intelligence techniques using feedback related to the predicting of the at least one of the one or more device components as needing to be at least one of repaired and replaced.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically predict one or more device components to be repaired and/or replaced in connection with a given device defect by processing a variety of data pertaining to the given device defect using artificial intelligence techniques. These and other embodiments can effectively overcome problems associated with lower repair yields, resource-related inefficiencies, and increased repeat return rates.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figures 12, 13:
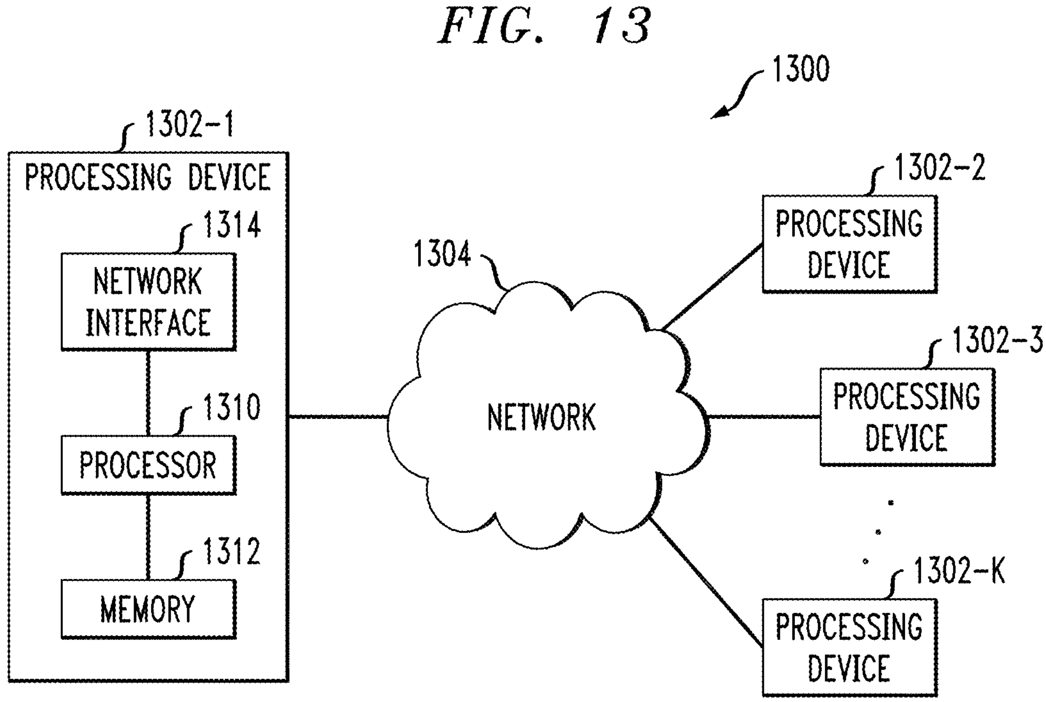
FIGS. 12 and 13 show examples of processing platforms that may be utilized to implement at least a portion of an information processing system in illustrative embodiments.

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more information processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a CPU, a GPU, a TPU, a microcontroller, an ASIC, a FPGA or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining information pertaining to at least one device defect;

defining multiple device component categories related to the at least one device defect;

determining one or more of the multiple device component categories as associated with the at least one device defect by processing at least a first portion of the obtained information in a processor-based machine learning system comprising at least one tokenization generator, at least one embedding layer having an input and an output, and at least one classification layer having an input coupled to the output of the embedding layer, wherein: (i) the at least one tokenization generator generates a tokenized representation of at least a first portion of the obtained information comprising at least one symptom description associated with the at least one device defect; (ii) the at least one embedding layer receives the tokenized representation at the input thereof and transforms the tokenized representation into a vector representation at the output of the at least one embedding layer; and (iii) the at least one classification layer receives the vector representation at the input of the at least one classification layer and generates, at an output of the at least one classification layer, one or more classification probability values associated with respective ones of the multiple device component categories;

identifying one or more device components associated with at least a second portion of the obtained information;

predicting at least one of the one or more device components associated with the at least a second portion of the obtained information, based at least in part on comparing (i) the one or more device components associated with the at least a second portion of the obtained information and (ii) the one or more device component categories associated with the at least one device defect, as needing to be at least one of repaired and replaced in connection with at least a portion of the at least one device defect, wherein predicting at least one of the one or more device components as needing to be at least one of repaired and replaced comprises:

determining one or more intersections between descriptions of device components associated with the one or more determined device component categories and descriptions of the one or more device components associated with the at least a second portion of the obtained information; and ranking at least a portion of the one or more intersections based at least in part on a number of one or more terms shared across the at least a portion of the one or more intersections; and performing one or more automated actions based at least in part on the predicting of the at least one of the one or more device components as needing to be at least one of repaired and replaced, wherein performing one or more automated actions comprises automatically initiating, using one or more automated systems in conjunction with the ranking of the at least a portion of the one or more intersections, at least one of one or more device component repair operations and one or more device component replacement operations;

wherein the method is performed by at least one processing device comprising a processor coupled to a memory.

2. The computer-implemented method of claim 1, wherein obtaining information pertaining to at least one device defect comprises obtaining at least one symptom description associated with the at least one device defect and at least one device identifier associated with at least a portion of the at least one device defect.

3. The computer-implemented method of claim 2, wherein determining one or more of the multiple device component categories as associated with the at least one device defect comprises processing at least a portion of the at least one symptom description associated with the at least one device defect in the processor-based machine learning system.

4. The computer-implemented method of claim 2, wherein identifying one or more device components associated with at least a second portion of the obtained information comprises filtering at least one dataset pertaining to multiple device components related to the at least one device defect using the at least one device identifier associated with the at least a portion of the at least one device defect.

5. The computer-implemented method of claim 1, wherein predicting at least one of the one or more device components as needing to be at least one of repaired and replaced comprises ranking at least a portion of the one or more intersections based at least in part on information pertaining to historical frequency of at least one of device component repairs and device component replacements components across the one or more device components identified as associated with the at least a second portion of the obtained information.

6. The computer-implemented method of claim 1, wherein determining one or more of the multiple device component categories as associated with the at least one device defect comprises processing the at least a first portion of the obtained information using at least one long short-term memory (LSTM) model.

7. The computer-implemented method of claim 1, wherein determining one or more of the multiple device component categories as associated with the at least one device defect comprises processing the at least a first portion of the obtained information using at least one transformers-based model.

8. The computer-implemented method of claim 1, wherein determining one or more of the multiple device component categories as associated with the at least one device defect comprises processing the at least a first portion of the obtained information using at least one clustering algorithm in conjunction with one or more deep learning techniques.

9. The computer-implemented method of claim 1, wherein performing one or more automated actions comprises automatically training at least a portion of the processor-based machine learning system using feedback related to the predicting of the at least one of the one or more device components as needing to be at least one of repaired and replaced.

10. A non-transitory processor-readable storage medium having stored therein program code of one or more software programs, wherein the program code when executed by at least one processing device causes the at least one processing device:

to obtain information pertaining to at least one device defect;

to define multiple device component categories related to the at least one device defect;

to determine one or more of the multiple device component categories as associated with the at least one device defect by processing at least a first portion of the obtained information in a processor-based machine learning system comprising at least one tokenization generator, at least one embedding layer having an input and an output, and at least one classification layer having an input coupled to the output of the embedding layer, wherein: (i) the at least one tokenization generator generates a tokenized representation of at least a first portion of the obtained information comprising at least one symptom description associated with the at least one device defect; (ii) the at least one embedding layer receives the tokenized representation at the input thereof and transforms the tokenized representation into a vector representation at the output of the at least one embedding layer; and (iii) the at least one classification layer receives the vector representation at the input of the at least one classification layer and generates, at an output of the at least one classification layer, one or more classification probability values associated with respective ones of the multiple device component categories;

to identify one or more device components associated with at least a second portion of the obtained information;

to predict at least one of the one or more device components associated with the at least a second portion of the obtained information, based at least in part on comparing (i) the one or more device components associated with the at least a second portion of the obtained information and (ii) the one or more device component categories associated with the at least one device defect, as needing to be at least one of repaired and replaced in connection with at least a portion of the at least one device defect, wherein predicting at least one of the one or more device components as needing to be at least one of repaired and replaced comprises:

determining one or more intersections between descriptions of device components associated with the one or more determined device component categories and descriptions of the one or more device components associated with the at least a second portion of the obtained information; and ranking at least a portion of the one or more intersections based at least in part on a number of one or more terms shared across the at least a portion of the one or more intersections; and to perform one or more automated actions based at least in part on the predicting of the at least one of the one or more device components as needing to be at least one of repaired and replaced, wherein performing one or more automated actions comprises automatically initiating, using one or more automated systems in conjunction with the ranking of the at least a portion of the one or more intersections, at least one of one or more device component repair operations and one or more device component replacement operations.

11. The non-transitory processor-readable storage medium of claim 10, wherein obtaining information pertaining to at least one device defect comprises obtaining at least one symptom description associated with the at least one device defect and at least one device identifier associated with at least a portion of the at least one device defect.

12. The non-transitory processor-readable storage medium of claim 11, wherein determining one or more of the multiple device component categories as associated with the at least one device defect comprises processing at least a portion of the at least one symptom description associated with the at least one device defect in the processor-based machine learning system.

13. The non-transitory processor-readable storage medium of claim 11, wherein identifying one or more device components associated with at least a second portion of the obtained information comprises filtering at least one dataset pertaining to multiple device components related to the at least one device defect using the at least one device identifier associated with the at least a portion of the at least one device defect.

14. An apparatus comprising:

at least one processing device comprising a processor coupled to a memory;

the at least one processing device being configured:

to obtain information pertaining to at least one device defect;

to define multiple device component categories related to the at least one device defect;

to determine one or more of the multiple device component categories as associated with the at least one device defect by processing at least a first portion of the obtained information in a processor-based machine learning system comprising at least one tokenization generator, at least one embedding layer having an input and an output, and at least one classification layer having an input coupled to the output of the embedding layer, wherein: (i) the at least one tokenization generator generates a tokenized representation of at least a first portion of the obtained information comprising at least one symptom description associated with the at least one device defect; (ii) the at least one embedding layer receives the tokenized representation at the input thereof and transforms the tokenized representation into a vector representation at the output of the at least one embedding layer; and (iii) the at least one classification layer receives the vector representation at the input of the at least one classification layer and generates, at an output of the at least one classification layer, one or more classification probability values associated with respective ones of the multiple device component categories;

to identify one or more device components associated with at least a second portion of the obtained information;

to predict at least one of the one or more device components associated with the at least a second portion of the obtained information, based at least in part on comparing (i) the one or more device components associated with the at least a second portion of the obtained information and (ii) the one or more device component categories associated with the at least one device defect, as needing to be at least one of repaired and replaced in connection with at least a portion of the at least one device defect, wherein predicting at least one of the one or more device components as needing to be at least one of repaired and replaced comprises:

determining one or more intersections between descriptions of device components associated with the one or more determined device component categories and descriptions of the one or more device components associated with the at least a second portion of the obtained information; and ranking at least a portion of the one or more intersections based at least in part on a number of one or more terms shared across the at least a portion of the one or more intersections; and to perform one or more automated actions based at least in part on the predicting of the at least one of the one or more device components as needing to be at least one of repaired and replaced, wherein performing one or more automated actions comprises automatically initiating, using one or more automated systems in conjunction with the ranking of the at least a portion of the one or more intersections, at least one of one or more device component repair operations and one or more device component replacement operations.

15. The apparatus of claim 14, wherein obtaining information pertaining to at least one device defect comprises obtaining at least one symptom description associated with the at least one device defect and at least one device identifier associated with at least a portion of the at least one device defect.

16. The apparatus of claim 15, wherein determining one or more of the multiple device component categories as associated with the at least one device defect comprises processing at least a portion of the at least one symptom description associated with the at least one device defect in the processor-based machine learning system.

17. The apparatus of claim 15, wherein identifying one or more device components associated with at least a second portion of the obtained information comprises filtering at least one dataset pertaining to multiple device components related to the at least one device defect using the at least one device identifier associated with the at least a portion of the at least one device defect.

18. The apparatus of claim 14, wherein predicting at least one of the one or more device components as needing to be at least one of repaired and replaced comprises ranking at least a portion of the one or more intersections based at least in part on information pertaining to historical frequency of at least one of device component repairs and device component replacements components across the one or more device components identified as associated with the at least a second portion of the obtained information.

19. The apparatus of claim 14, wherein determining one or more of the multiple device component categories as associated with the at least one device defect comprises processing the at least a first portion of the obtained information using at least one long short-term memory (LSTM) model.

20. The apparatus of claim 14, wherein determining one or more of the multiple device component categories as associated with the at least one device defect comprises processing the at least a first portion of the obtained information using at least one transformers-based model.

* * * * *